(12) United States Patent
Atwood et al.

(10) Patent No.: US 9,649,815 B2
(45) Date of Patent: May 16, 2017

(54) COATING FOR PRECISION RAILS AND A SYSTEM FOR CLEANING PRECISION RAILS IN THREE-DIMENSIONAL OBJECT PRINTING SYSTEMS

(71) Applicant: Xerox Corporation, Norwalk, CT (US)

(72) Inventors: Christopher D. Atwood, Webster, NY (US); Timothy P. Foley, Marion, NY (US); Elizabeth M. Crossen, Churchville, NY (US); Annie Liu, Webster, NY (US); David S. Derleth, Webster, NY (US); Matthew D. Savoy, Webster, NY (US); Frank B. Tamarez Gomez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 106 days.

(21) Appl. No.: 14/692,804

(22) Filed: Apr. 22, 2015

(65) Prior Publication Data

US 2016/0311169 A1    Oct. 27, 2016

(51) Int. Cl.
*B08B 3/00* (2006.01)
*B29C 67/00* (2017.01)
*B33Y 10/00* (2015.01)
*B33Y 40/00* (2015.01)

(52) U.S. Cl.
CPC ...... *B29C 67/0096* (2013.01); *B29C 67/0059* (2013.01); *B29C 67/0085* (2013.01); *B33Y 10/00* (2014.12); *B33Y 40/00* (2014.12)

(58) Field of Classification Search
CPC ..... B08B 11/00; B29C 67/0096; B33Y 10/00; B33Y 40/00

USPC .......................................................... 134/201
See application file for complete search history.

(56) References Cited

U.S. PATENT DOCUMENTS

| | | | |
|---|---|---|---|
| 2,765,547 | A | 10/1956 | Dimmel et al. |
| 2,944,275 | A | 7/1960 | Markusen |
| 5,904,100 | A | 5/1999 | Findley et al. |
| 6,191,507 | B1 | 2/2001 | Peltier et al. |
| 6,688,021 | B2 | 2/2004 | Baig et al. |
| 7,070,250 | B2 | 7/2006 | Lester et al. |
| 8,167,395 | B2 | 5/2012 | Fienup et al. |
| 8,288,004 | B2 | 10/2012 | Moorlag et al. |
| 8,692,011 | B2 | 4/2014 | Moorlag et al. |
| 8,851,664 | B2 | 10/2014 | Spence |
| 2011/0125307 | A1 | 5/2011 | Dickson et al. |
| 2012/0157277 | A1 | 6/2012 | Moorlag et al. |

(Continued)

FOREIGN PATENT DOCUMENTS

EP    2 474 418 B1    7/2012

*Primary Examiner* — Eric Golightly
(74) *Attorney, Agent, or Firm* — Maginot Moore & Beck LLP (57) ABSTRACT

A printing system includes a housing, a track supported by the housing, and a cart which rides along the track. The printing system also includes print heads which eject material onto the cart. To prevent material from inadvertently accumulating on the track and the housing, the cart also includes a wiper configured to wipe the material from at least a portion of the housing. The printing system also includes at least one collection tray configured to direct and/or collect the material wiped from the housing. The printing system further includes a coating applied to outer surfaces of at least some of the elements of the housing, the track, and the cart to further prevent the material from inadvertently accumulating on the track and the housing. The coating can be a siloxyfluorocarbon coating.

12 Claims, 6 Drawing Sheets

(56) References Cited

U.S. PATENT DOCUMENTS

2013/0293652 A1 11/2013 Spence et al.
2013/0293653 A1 11/2013 Spence et al.
2014/0125749 A1 5/2014 Spence

COATING FOR PRECISION RAILS AND A SYSTEM FOR CLEANING PRECISION RAILS IN THREE-DIMENSIONAL OBJECT PRINTING SYSTEMS

TECHNICAL FIELD

The system and method disclosed in this document relate to printers that produce three-dimensional objects and, more particularly, to the maintenance of cart drive mechanisms in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Typically, print heads, which are similar to the printheads found in document printers, include an array of ejectors that are coupled to a supply of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. Three-dimensional printing is distinguishable from traditional object-forming techniques, which mostly rely on the removal of material from a work piece by a subtractive process, such as cutting or drilling.

Figure 6:
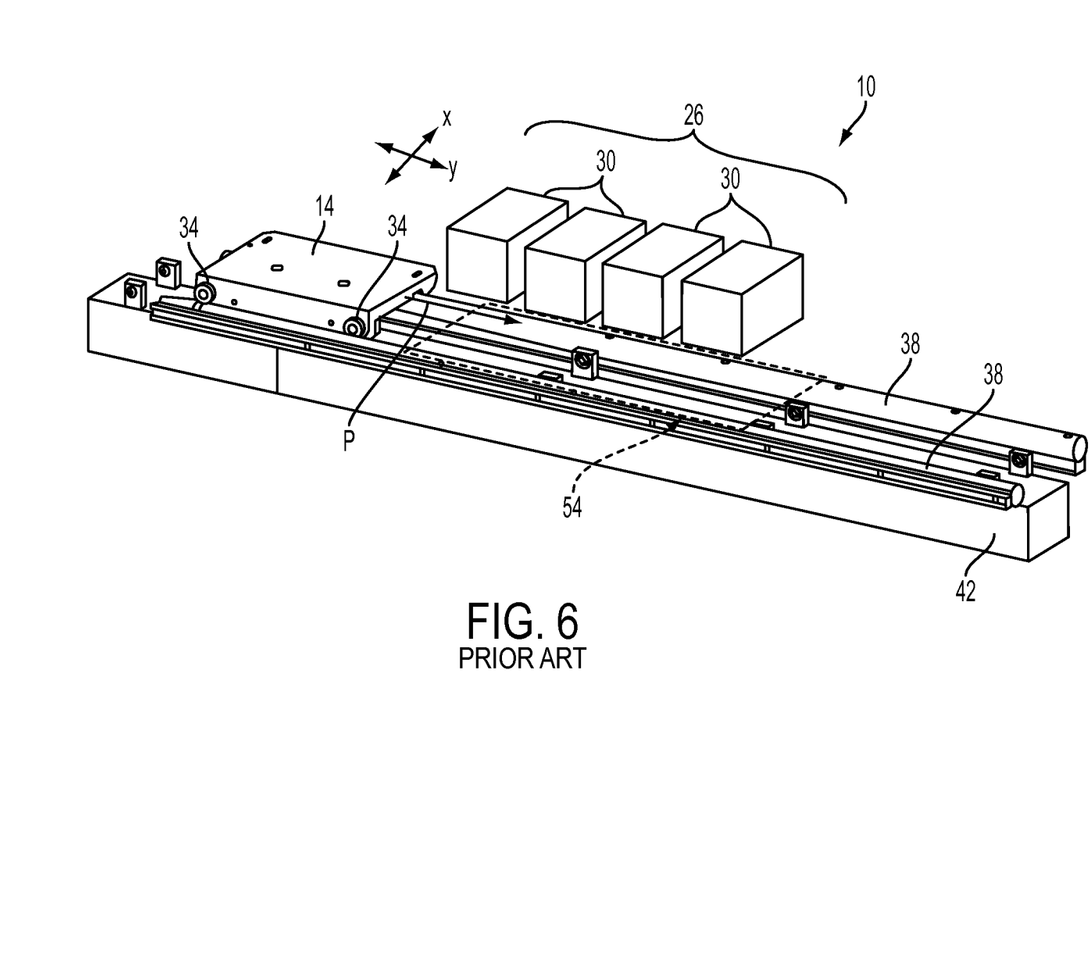
FIG. 6 is a perspective view of the prior art three-dimensional object printing system of FIG. 5.

A prior art three-dimensional object printing system 10 is shown in FIG. 6. In the view depicted in that figure, a platform 14, called a cart, moves in a process direction P between printing stations, such as the printing station 26 shown in the figure. Printing station 26 includes four print heads 30 as shown in the figure, although fewer or more print heads can be used in a printing station. Once the cart 14 reaches the printing station 26, the cart 14 traverses in process direction P, underneath the printing station, supported by bearings 34 which roll upon a track of precision rails 38. The precision rails 38 are cylindrical rail sections that are manufactured within tight tolerances to help ensure accurate placement and maneuvering of the cart 14 beneath the print heads 30. Linear electrical motors are provided within a motor housing 42 of the printing system 10 and are operatively connected to the bearings 34 to guide the cart 14 on the precision rails 38.

As the cart 14 passes beneath the printing station 26, ejection of material occurs in synchronization with the motion of the cart. The electrical motors in housing 42 move the cart in the process direction P in an X-Y plane that is parallel to the printing station 26 as layers of material are printed on the cart 14. Additional motors (not shown) move the printing station 26 vertically with respect to the cart 14 as layers of material accumulate to form an object. Alternatively, a mechanism can be provided to move the cart 14 vertically with respect to rails 38 as the object is formed on the top surface of the cart. Once the printing to be performed by a printing station is finished, the cart 14 is moved to another printing station or to a station for layer curing or other processing.

Figure 5:
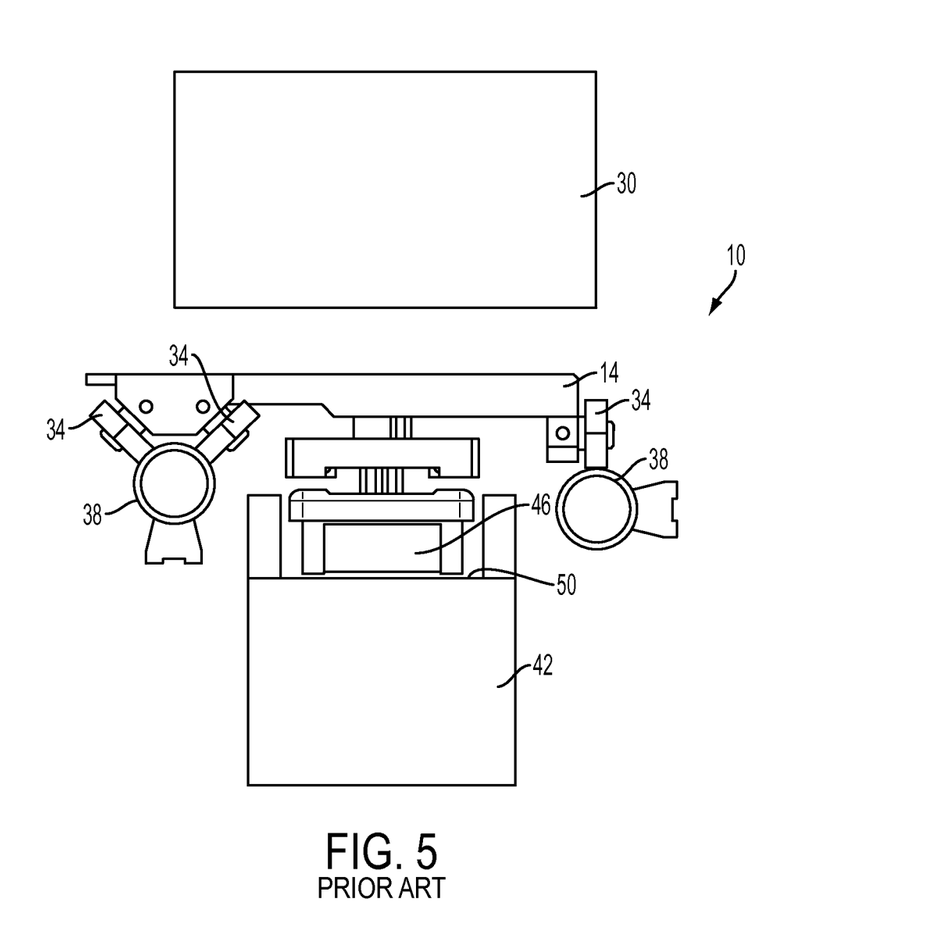
FIG. 5 is an end view of a prior art three-dimensional object printing system.

An end view of the prior art system 10 is shown in FIG. 5 which depicts in more detail the bearings 34 on which the cart 14 rides the rails 38. The bearings 34 of the cart 14 are positioned on the precision rails 38 in an arrangement that facilitates accurate positioning of the build platen on the cart 14. Specifically, bearings 34 are positioned at a right angle to one another on one of the rails 38 to remove 4 degrees of freedom of the cart 14, while the other bearing 34 rests on the other rail 38 to remove one more degree of freedom. A linear motor operates to move the cart 14 over an upper surface 50 of the motor housing 42. The motor has a stationary motor segment (not shown) within the motor housing 42 and a magnet 46 mounted to the underside of the cart 14. Gravity and magnetic attraction between the stationary motor segment and the magnet 46 hold the bearings 34 in contact with the rails 38.

When carts are not present underneath the print heads 30, as shown in FIG. 6, errant drips of materials can fall from the print heads 30 into the functional area 54 and produce undesired debris and contamination on the precision rails 38 and the housing 42 in the functional area 54. Also, air-borne contaminants in the environment, such as dust or other particulate matter, can fall into the functional area 54 and collect on the rails 38 and the housing 42. When these contaminants and debris are located at any interface between the bearings 34 and the rails 38, the linear velocity of the cart is disrupted and the quality of the printed object is affected. Similarly, when these materials are within the gap between the top surface 50 of the motor housing 42 and the magnet 46 (shown in FIG. 5), the magnetic attraction can be affected and enable the cart to be less constrained. Additionally, the collection of material drops on top of the motor housing 42 can also affect the dissipation of heat from the motor and cause motion quality disturbances, impacting the performance and reliability of the motor. In order to produce three-dimensional objects with acceptable quality, the motion of the cart 14 beneath the print heads 30 needs to be precise. Therefore, improvements in three-dimensional printing systems that help prevent and eliminate the contamination on the precision rails and motor housing that affects the accuracy of the placement and movement of the cart would be beneficial.

SUMMARY

An improved printing system that helps prevent and eliminate the collection of materials from the print heads and other debris is disclosed herein. The improved printing system includes a printing station, a housing, a track, a cart, and a hydrophobic, oleophobic coating. The printing station includes print heads for ejecting material onto a substrate. The housing is at least partially adjacent to the printing station, and the track is at least partially supported by the housing. The cart supports the substrate and is movable along the track relative to the printing station. The hydrophobic, oleophobic coating is on at least a portion of at least one of the track and the housing to resist accumulation of the material thereon.

An apparatus for mounting within a printer having a housing and a printing station including print heads for ejecting material onto a substrate is disclosed herein. The apparatus includes a track, a cart, and a hydrophobic, oleophobic coating. The track is positioned at least partially adjacent to the printing station and supported at least partially by the housing, and the cart supports the substrate and is movable along the track relative to the printing station. The hydrophobic, oleophobic coating is on at least a portion of at least one of the track and the housing to resist accumulation of the material thereon.

A method of maintaining a substrate transport mechanism including a housing, a track supported by the housing, and a cart which travels along the track is disclosed herein. The method includes applying a hydrophobic, oleophobic coating at least to at least a portion of at least one of the track and the housing of the substrate transport mechanism. The method further includes collecting material from the at least a portion of the at least one of the track and the housing in a collecting tray. The method further includes wiping the collected material out of the collecting tray.

BRIEF DESCRIPTION OF THE DRAWINGS

The foregoing aspects and other features of a printing system that help prevent and eliminate the collection of materials from the ejectors heads on functional surfaces of the printing system are explained in the following description, taken in connection with the accompanying drawings.

DETAILED DESCRIPTION

For a general understanding of the environment for the system and method disclosed herein as well as the details for the system and method, reference is made to the drawings. In the drawings, like reference numerals designate like elements.

Figure 1:
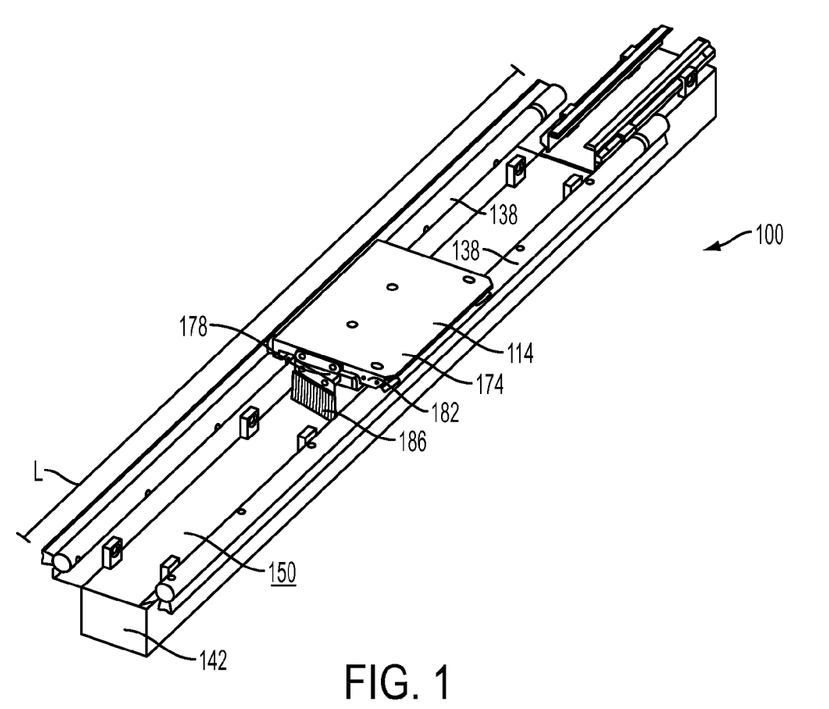
FIG. 1 is a top perspective view of a track and a cart for use within a three-dimensional object printing system.

As shown in FIG. 1, a three-dimensional object printing system 100 includes a cart 114, a track of precision rails 138, and a motor housing 142 substantially similar to the cart 14, the track of precision rails 38, and motor housing 42 described above with respect to the prior art three-dimensional object printing system 10 (shown in FIGS. 5 and 6). The cart 114 is configured to ride along the precision rails 138 as generally described above. The motor housing 142 includes an upper surface 150, substantially similar to the upper surface 50 of three-dimensional object printing system 10, and the motor housing 142 is arranged beneath the precision rails 138 to support the precision rails 138 and provide additional stability to the cart 114 as the cart 114 moves along the precision rails.

Figure 2:
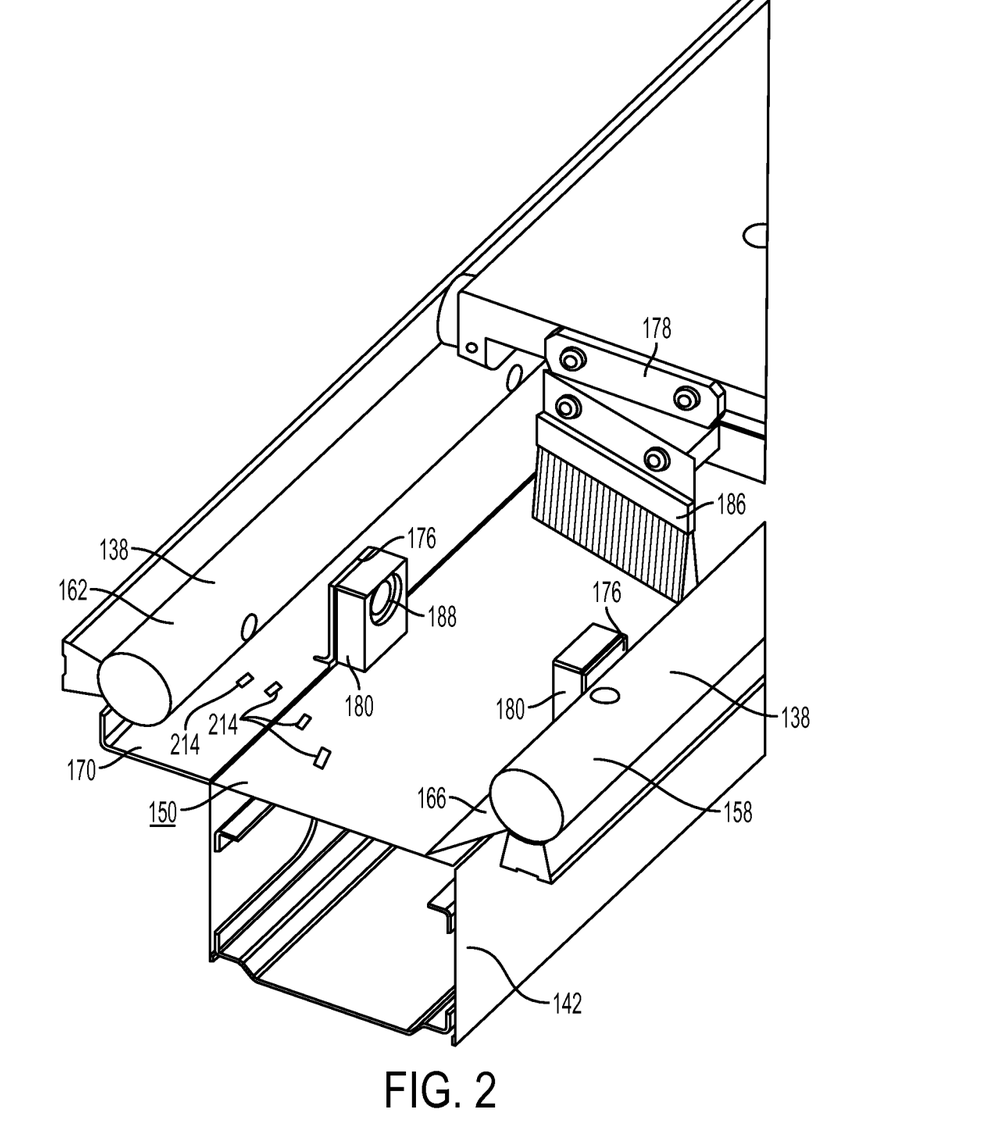
FIG. 2 is a top perspective view of a portion of the cart and track of FIG. 1.

As shown in more detail in FIG. 2, the precision rails 138 include an inboard rail 158, arranged on an inboard side of the printing system 100, and an outboard rail 162, arranged on an outboard side of the printing system 100. The printing system 100 further includes an inboard drip tray 166, configured to direct debris and other unwanted material, also referred to as contamination 214, associated with the inboard rail 158 toward the upper surface 150 of the motor housing 142, and an outboard drip tray 170, configured to collect contamination 214 associated with the outboard rail 162 and the upper surface 150 of the motor housing 142. Each of the inboard drip tray 166 and the outboard drip tray 170 includes a plurality of tabs 176 which project upwardly from the side of the drip tray arranged nearest to the motor housing 142 (shown in FIGS. 2 and 3). The motor housing 142 includes corresponding tabs 180 projecting upwardly from both sides of the motor housing and configured to match up with respective tabs 176 formed on the drip trays 166, 170. The drip trays 166, 170 are then coupled to the motor housing 142 by fasteners 184 (shown in FIG. 3) received through co-aligning openings 188 formed in the tabs 176 and 180.

The tabs 176 provided on the inboard and outboard drip trays 166, 170, the tabs 180 provided on the motor housing 142, and the fasteners 184, are included in the embodiment of the printing system 100 shown in the Figures and described herein as an exemplary means of fastening the inboard and outboard drip trays 166, 170 to the motor housing 142. However, it will be understood that the inboard and outboard drip trays 166, 170 can be coupled to the motor housing 142 by other means which stably and securely fasten the drip trays 166, 170 to the motor housing 142 without interfering with the movement of the cart 114 within the printing system 100.

Figure 3:
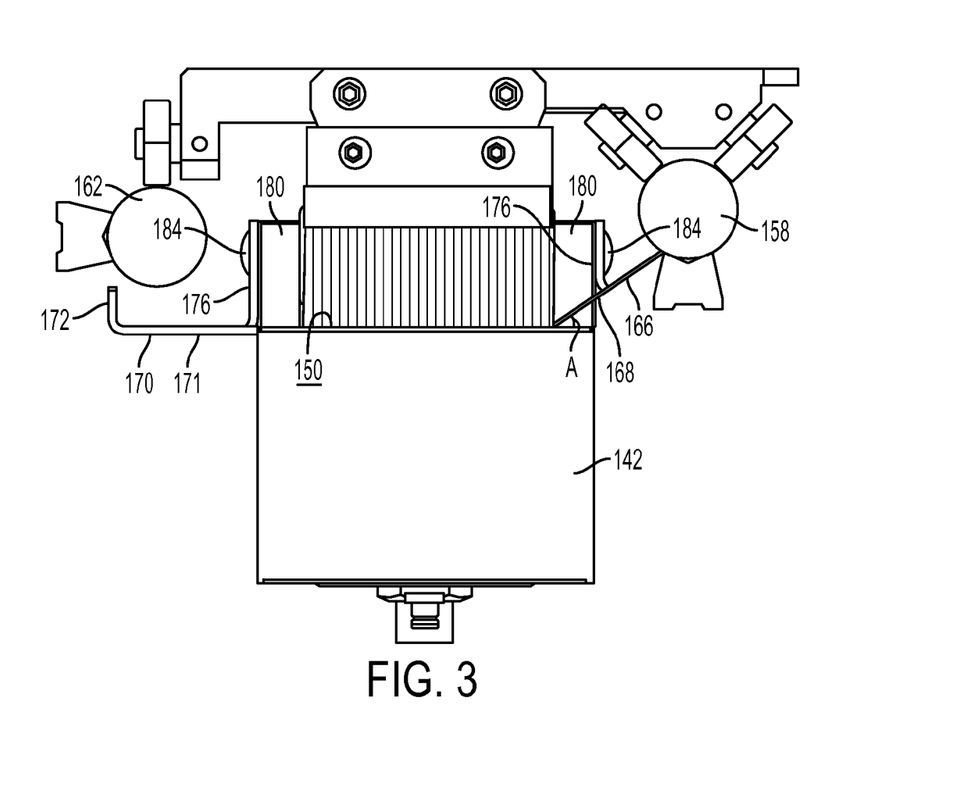
FIG. 3. is a front end view of the cart on the track of FIG. 1

As shown in more detail in FIG. 3, the inboard drip tray 166 includes a slanted portion 168 coupled to the motor housing 142 by the fasteners 184 received in the openings 188 of the tabs 176 and 180 (shown in FIG. 2). The slanted portion 168 extends along an entire length L (shown in FIG. 1) of the inboard rail 158 and is arranged at an angle from just beneath the inboard rail 158 downwardly and outwardly to the upper surface 150 of the motor housing 142. In at least one embodiment, the slanted portion 168 is arranged at an angle A of approximately 30 degrees relative to the upper surface 150 of the motor housing 142. Accordingly, the inboard drip tray 166 directs contamination 214 (shown in FIG. 2) which slides off the inboard rail 158 and/or accumulates on the inboard drip tray 166 downwardly toward the upper surface 150 of the motor housing 142.

The outboard drip tray 170 is substantially "L" shaped having an inner portion 171 and an outer portion 172 arranged generally perpendicularly to one another and joined together at a substantially 90 degree angle. The outboard drip tray 170 extends along an entire length L (shown in FIG. 1) of the outboard rail 162. The inner portion 171 is arranged nearest to the motor housing 142 and includes the tabs 176 which align with the tabs 180 on the motor housing 142 to enable the fasteners 184 to couple the outboard drip tray 170 to the motor housing 142. The inner portion 171 is further arranged coplanar with or slightly below the upper surface 150 of the motor housing 142 so that contamination 214 (shown in FIG. 2) that accumulates on the inner portion 171 is retained within the outboard drip tray 170. The inner portion 171 is substantially flat. However, in at least one embodiment, the inner portion 171 is angled slightly downwardly away from the upper surface 150 of the motor housing 142 so that contamination that accumulates on the inner portion 171 is retained within the outboard drip tray 170.

The outboard drip tray 170 is coupled to the motor housing 142 so that the inner portion 171 projects from the motor housing 142 outwardly beneath the outboard rail 162 and the outer portion 172 projects upwardly from the inner portion 171 opposite and substantially parallel to the tabs 176. The outboard drip tray 170 is configured so that the outboard rail 162 is arranged generally above the inner portion 171, in above a space between the outer portion 172 and the tabs 176, so that any contamination which slides off the outboard rail 162 lands on the inner portion 171 of the outboard drip tray 170.

Returning to FIG. 1, in addition to bearings 134 substantially similar to the bearings 34 described above, the cart 114 also includes a base 174 to which the bearings 134 are mounted, a wiper block 178 mounted on a front side 182 of the base 174, and a wiper 186 mounted on the wiper block 178. The cart 114 and the wiper block 178 are configured to enable the wiper 186 to contact the upper surface 150 of the motor housing 142 as the cart 114 moves along the rails 138. In one embodiment, the wiper 186 is formed as a brush having a plurality of bristles. However, in an alternative embodiment, the wiper 186 can be formed as a flexible blade. The wiper 186 projects downwardly from the cart 114 at a distance that is sufficient to bring the wiper 186 into contact with the upper surface 150, but is not so great that the wiper 186 becomes damaged or jammed as the cart 114 moves along the rails 138. In other words, the wiper 186 is configured to flex slightly upon contact with the upper surface 150 so that the wiper 186 wipes the upper surface 150 as the cart 114 moves along the rails 138.

Figure 4:
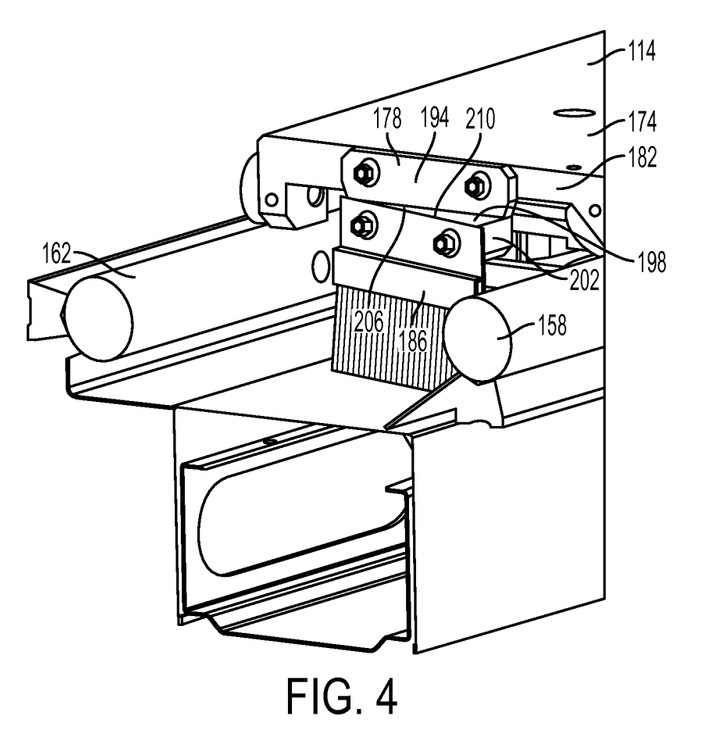
FIG. 4 is a front perspective view of a portion of the cart and track of FIG. 1.

As shown in more detail in FIG. 4, the wiper block 178 includes a vertical portion 194, mounted to the front side 182 of the base 174 of the cart 114, and a wedge portion 198 projecting forwardly from the vertical portion 194. The wedge portion 198 is wider at an inboard end 202, arranged near the inboard rail 158, and narrows toward an outboard end 206, arranged near the outboard rail 162. Thus, a front 210 of the wedge portion 198, extending from the inboard end 202 to the outboard end 206, is angled toward the outboard rail 162. The wiper 186 is mounted to the front 210 of the wedge portion 198 of the wiper block 178. Accordingly, the wiper 186 is also angled toward the outboard rail 162.

As shown in FIG. 5, and described above, during a printing operation, print heads 30 eject material toward the cart 114. However, contamination 214 (shown in FIG. 2) due to satellite drops from the print heads 30, misfiring print heads 30, dripping print heads 30, dust, splattering, or other error, may fall upon the upper surface 150 of the motor housing 142, the inboard rail 158, the outboard rail 162, the inboard drip tray 166, or the outboard drip tray 170 in the functional area 54 (shown in FIG. 6). As shown in FIG. 2, contamination 214 that falls upon the inboard rail 158 slides off the cylindrical shape of the precision rail 138 and onto the inboard drip tray 166 below. Due to the angle A (shown in FIG. 3) of the slanted portion 168 of the inboard drip tray 166, contamination 214 that falls onto the inboard drip tray 166, either directly or by way of the inboard rail 158, slides downwardly and inwardly onto the upper surface 150 of the motor housing 142. Contamination 214 that falls upon the outboard rail 162 slides off the cylindrical shape of the precision rail 138 and onto the inner portion 171 of the outboard drip tray 170 below. Accordingly, contamination 214 is directed toward the upper surface 150 of the motor housing 142 and the inner portion 171 of the outboard drip tray 170.

When the cart 114 moves along the rails 138, the wiper 186 wipes the contamination 214 from the upper surface 150 of the motor housing 142. Due to the wedge shape of the wiper block 178, the wiper 186 wipes the contamination 214 toward the inner portion 171 of the outboard drip tray 170. Thus, all of the contamination 214 is moved toward the outboard drip tray 170 where it is accumulated and retained due to the shape and arrangement of the inner portion 171 of the outboard drip tray 170 and due to the outermost wall provided by the outer portion 172 of the outboard drip tray 170. Therefore, to clean contamination 214 from the printing system 100, the user must only clean the accumulated contamination 214 from the outboard drip tray 170.

To facilitate the maintenance and cleaning of the printing system 100, outer surfaces of at least one of the upper surface 150 of the motor housing 142, the inboard rail 158, the outboard rail 162, the inboard drip tray 166, the outboard drip tray 170, the bearings 134, and the wiper 186 are coated with a hydrophobic, oleophobic coating. This coating prevents the contamination 214 from sticking to and accumulating on the outer surface of any of those functional elements of the printing system 100. Of course, the contamination 214 which is directed toward the outboard drip tray 170 does accumulate in the outboard drip tray 170, but, due to the coating, is easily wiped from the outboard drip tray 170 by a user during maintenance and cleaning of the printing system 100. In an alternative embodiment, not all of the upper surface 150 of the motor housing 142, the inboard rail 158, the outboard rail 162, the inboard drip tray 166, the outboard drip tray 170, the bearings 134, and the wiper 186 are coated with the hydrophobic, oleophobic coating. However, each surface which is coated will resist accumulation of contamination 214 thereon.

In at least one embodiment, the coating is a siloxyfluorocarbon coating and is applied to the outer surfaces of the upper surface 150 of the motor housing 142, the inboard rail 158, the outboard rail 162, the inboard drip tray 166, the outboard drip tray 170, the bearings 134, and the wiper 186 by spraying. In alternative embodiments, the coating can be a different material having similar properties to the siloxyfluorocarbon coating. In other alternative embodiments, the coating can be applied to the outer surfaces by another coating process which produces a controlled, consistent coating.

The coating adheres well to steel or stainless steel, is scratch resistant and wear resistant, and provides a surface that resists wetting from the material ejected from the print heads 30. The use of siloxyfluorocarbon as the coating is particularly advantageous due to the high wear resistance of the material. Because the bearings 134 bear repeatedly and frequently on the inboard rail 158 and the outboard rail 162, the high wear resistance of siloxyfluorocarbon, in combination with its hydrophobicity and oleophobicity, makes it an ideal coating for the outer surfaces of the functional elements of the printing system 100. Additionally, the siloxane groups of the siloxyfluorocarbon coating provide efficient bonding of the coating to a steel substrate and the siloxyfluorocarbon coating provides a hybrid ceramic/fluorocarbon surface which further effectively resists wear and scratching.

The coating can be applied to the outer surfaces of the functional elements prior to and/or after installation of the printing system 100 and can easily be reapplied during maintenance conducted throughout the life of the printing system 100. Cleaning the outboard drip tray 170 to remove accumulated contamination needs to be performed infrequently due to the holding capacity of the outboard drip tray 170 and the small amount of matter that will accumulate therein. When cleaning of the outboard drip tray 170 is performed, the coating enables the outboard drip tray 170 to be cleaned by merely wiping out the accumulated contamination.

It is further advantageous to use the coating in three-dimensional object printing systems, such as printing system 100, because the material printed onto the cart 114 is typically applied to cover a high percentage of a large area of the cart 114. Because a large amount of material is ejected from the print heads to cover so much of the area of the cart 114, there is a considerable amount of material that is misfired or does not land in its intended position on the cart 114. Accordingly, it is advantageous in three-dimensional object printing systems, such as printing system 100, to provide a coating to help resist and eliminate the amount of material ejected from the print heads that does not land in its intended position on the cart 114.

It is additionally advantageous to use the coating in three-dimensional object printing systems, such as printing system 100, because such printing systems have tight tolerances for the location of the cart 114. Any disturbance of the location of the cart 114 not only affects the image quality within a layer of printed material, but also the three-dimensional image quality among layers which are applied on top of one another. Accordingly, it is advantageous in three-dimensional object printing systems, such as printing system 100, to provide a coating to help resist and eliminate the amount of material accumulating on the functional elements of the printing system due to the high precision required to print quality three-dimensional objects.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A printing system comprising:
    a printing station including print heads for ejecting material onto a substrate;
    a housing at least partially adjacent to the printing station;
    a track at least partially supported by the housing;
    a cart supporting the substrate and movable along the track relative to the printing station;
    a hydrophobic, oleophobic coating on at least a portion of at least one of the track and the housing to resist accumulation of the material thereon; and
    a wiper coupled to the cart and arranged to contact at least a portion of the housing as the cart moves along the track, wherein the wiper directs accumulated material off at least a portion of the housing as the cart moves along the track.

2. The printing system of claim 1 wherein the hydrophobic, oleophobic coating is comprised of siloxyfluorocarbon.

3. The printing system of claim 1 wherein the coating is applied to the at least a portion of the at least one of the track and the housing by spraying.

4. The printing system of claim 1 wherein the wiper is a brush having a plurality of bristles.

5. The printing system of claim 1 further comprising:
    at least one collecting tray adjacent to the track, wherein the wiper directs the accumulated material toward the at least one collecting tray.

6. The printing system of claim 5 wherein the at least one collecting tray has a hydrophobic, oleophobic tray coating.

7. The printing system of claim 6 wherein the hydrophobic, oleophobic tray coating is comprised of siloxyfluorocarbon.

8. An apparatus for mounting within a printer having a housing and a printing station including print heads for ejecting material onto a substrate, the apparatus comprising:
    a track positioned at least partially adjacent to the printing station and supported at least partially by the housing;
    a cart supporting the substrate and movable along the track relative to the printing station;
    a hydrophobic, oleophobic coating on at least a portion of at least one of the track and the housing to resist accumulation of the material thereon; and
    a wiper coupled to the cart, wherein the wiper directs accumulated material off the housing as the cart moves along the track.

9. The apparatus of claim 8 wherein the hydrophobic, oleophobic coating is comprised of siloxyfluorocarbon.

10. The apparatus of claim 8 further comprising:
    at least one collecting tray adjacent to the track, wherein the wiper directs the accumulated material toward the at least one collecting tray.

11. The apparatus of claim 10 wherein the at least one collecting tray has a hydrophobic, oleophobic tray coating.

12. The apparatus of claim 11 wherein the hydrophobic, oleophobic tray coating is comprised of siloxyfluorocarbon.

* * * * *